(12) United States Patent
Koskinen et al.

(10) Patent No.: US 10,440,614 B2
(45) Date of Patent: *Oct. 8, 2019

(54) INTERRUPTIONS IN WIRELESS COMMUNICATIONS

(71) Applicant: Nokia Solutions and Networks Oy, Espoo (FI)

(72) Inventors: Henri Markus Koskinen, Espoo (FI); Chunli Wu, Beijing (CN); Benoist Pierre Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,925

(22) Filed: Jan. 20, 2017

(65) Prior Publication Data

US 2017/0134992 A1 May 11, 2017

Related U.S. Application Data

(63) Continuation of application No. 14/349,216, filed as application No. PCT/EP2011/067136 on Sep. 30, 2011, now Pat. No. 9,590,771.

(51) Int. Cl.
| | |
|---|---|
| *H04W 36/00* | (2009.01) |
| *H04L 1/18* | (2006.01) |
| *H04W 36/08* | (2009.01) |
| *H04L 12/64* | (2006.01) |
| *H04W 36/04* | (2009.01) |

(52) U.S. Cl.
CPC ....... *H04W 36/0016* (2013.01); *H04L 1/1812* (2013.01); *H04L 1/1838* (2013.01); *H04L 1/1848* (2013.01); *H04L 12/6418* (2013.01); *H04W 36/04* (2013.01); *H04W 36/08* (2013.01)

(58) Field of Classification Search
CPC . H04W 36/0016; H04W 36/04; H04W 36/08; H04L 1/1812; H04L 12/6418; H04L 1/1838; H04L 1/1848
See application file for complete search history.

(56) References Cited

U.S. PATENT DOCUMENTS

| | | | |
|---|---|---|---|
| 2003/0007480 A1 | 1/2003 | Kim | 370/349 |
| 2004/0052229 A1 | 3/2004 | Terry | 370/335 |

(Continued)

FOREIGN PATENT DOCUMENTS

| | | |
|---|---|---|
| EP | 2 048 806 A1 | 4/2009 |
| WO | WO 2009/058070 A1 | 5/2009 |
| WO | WO 2009/076124 A1 | 6/2009 |

OTHER PUBLICATIONS

3GPP TSG-RAN WG2#58bis, Orlando, USA, Jun. 25-29, 2007, Tdoc R2-072907, "Summary of email discussion on reordering issue in Enhanced Cell_Fach", 19 pgs.

(Continued)

*Primary Examiner* — Jackie Zuniga Abad
(74) *Attorney, Agent, or Firm* — Harrington & Smith

(57) ABSTRACT

Method and apparatus for reception of data units in a device by means of a first protocol and a second protocol are disclosed. A control function of the second protocol is informed of interruption in a control function of the first protocol. In response thereto a reordering timer of the second protocol is considered as having expired, and a state variable of the second protocol is updated to equal with a highest received state variable.

22 Claims, 4 Drawing Sheets

(56) References Cited

U.S. PATENT DOCUMENTS

| | | | |
|---|---|---|---|
| 2004/0208160 A1 | 10/2004 | Petrovic | 370/350 |
| 2007/0047452 A1* | 3/2007 | Lohr | H04B 7/2612 |
| | | | 370/242 |
| 2008/0148136 A1* | 6/2008 | Bae | H04L 1/1874 |
| | | | 714/799 |
| 2008/0188224 A1* | 8/2008 | Pani | H04W 36/02 |
| | | | 455/436 |
| 2009/0016301 A1 | 1/2009 | Sammour | 370/331 |
| 2009/0034476 A1 | 2/2009 | Wang | 370/331 |
| 2009/0086657 A1 | 4/2009 | Alpert | 370/310 |
| 2009/0086704 A1 | 4/2009 | Ho | 370/346 |
| 2009/0086756 A1* | 4/2009 | Tseng | H04L 1/1829 |
| | | | 370/469 |
| 2009/0252182 A1 | 10/2009 | Maheshwari | 370/474 |
| 2009/0268683 A1* | 10/2009 | Ho | H04L 1/1628 |
| | | | 370/329 |
| 2009/0271679 A1 | 10/2009 | Harada | 714/748 |
| 2009/0312007 A1 | 12/2009 | Kallio | 455/422.1 |
| 2009/0316664 A1 | 12/2009 | Wu | 370/336 |
| 2009/0319850 A1 | 12/2009 | Baek | 714/748 |
| 2010/0027538 A1 | 2/2010 | Harada | 370/389 |
| 2010/0110985 A1 | 5/2010 | Umesh | 370/328 |
| 2010/0135303 A1* | 6/2010 | Umesh | H04L 1/1812 |
| | | | 370/394 |
| 2010/0153803 A1 | 6/2010 | Harada | 714/748 |
| 2010/0195519 A1 | 8/2010 | Ji | 370/252 |
| 2010/0208651 A1 | 8/2010 | Ramos Peres | 370/328 |
| 2010/0257423 A1 | 10/2010 | Kim | 714/749 |
| 2010/0261468 A1 | 10/2010 | Chun | 455/422.1 |
| 2010/0309788 A1 | 12/2010 | Ho | 370/236 |
| 2011/0019756 A1 | 1/2011 | Chun | 375/260 |
| 2011/0044195 A1 | 2/2011 | Wiemann | 370/252 |
| 2012/0047407 A1* | 2/2012 | Tilwani | H04L 1/1841 |
| | | | 714/55 |
| 2012/0089892 A1 | 4/2012 | Kang | 714/799 |
| 2014/0362826 A1* | 12/2014 | Chao | H04L 1/1854 |
| | | | 370/331 |

OTHER PUBLICATIONS

ETSI TS 125 321 V7.8.0 (Apr. 2008), "Universal Mobile Telecommunications System (UMTS); Medium Access Control (MAC) protocol specification (3GPP TS 25.321 version 7.8.0 Release 7)", 152 pgs.

* cited by examiner

US 10,440,614 B2

INTERRUPTIONS IN WIRELESS COMMUNICATIONS

CROSS-REFERENCE TO RELATED APPLICATIONS

This application is a continuation of U.S. patent application Ser. No. 14/349,216, which is the U.S. National Stage of International Application No. PCT/EP2011/067136, filed Sep. 30, 2011.

The invention relates to methods and apparatuses for wireless communications and in particular to handling of interruptions, for example handling of retransmissions and/or other functions at a reset of a protocol.

A communication system enables communication between two or more communication devices such as user terminals, base stations and/or other nodes by providing carriers between the communication devices. In a wireless communication system at least a part of communications between at least two stations occurs over wireless interfaces. A user can access a communication system by means of an appropriate communication device or terminal. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system can be provided with error correction functionality, such as with a possibility of requesting for retransmission of any information that the recipient node did not successfully receive. For example, hybrid automatic repeat request (HARQ) error control mechanism may be used for this purpose. The error control mechanism can be implemented such that a device which receives either a positive or a negative acknowledgement (ACK/NACK) or other indication from another device of an error free or erroneous receipt of transmitted data can take appropriate action. Typically this means resending of a protocol data unit to the receiving device in response to a negative acknowledgement so as to rectify the situation.

A problematic situation may occur when there is an interruption in operation of a protocol handling the error correction. For example, operation of a protocol entity receiving and/or sending protocol data units, causing sending of requests for retransmission, and/or responding the requests may be temporarily or permanently interrupted, for example because of reset of the entity. This can cause delays in the communications. In accordance with an aspect there is provided a method for reception of data units in a device by means of a first protocol and a second protocol, comprising informing a control function of the second protocol of interruption in a control function of the first protocol, and in response thereto considering a reordering timer of the second protocol as expired and updating a state variable of the second protocol to equal with a highest received state variable.

In accordance with another aspect there is provided an apparatus for handling reception of data units in a device by means of a first protocol and a second protocol, the apparatus comprising at least one processor, and at least one memory including computer program code, wherein the at least one memory and the computer program code are configured, with the at least one processor, to provide a control function of the second protocol with an indication of interruption in a control function of the first protocol, and in response to the indication consider a reordering timer of the second protocol as expired and update a state variable of the second protocol to equal with a highest received state variable.

In accordance with a more specific aspect the interruption comprises a reset of the control function of the first protocol at a receiving node.

The first protocol may comprise media access control (MAC) protocol. The second protocol may be a protocol is located above the MAC protocol in the layered protocol model. The second protocol can comprise radio link control (RLC) protocol or packet data convergence protocol (PDCP).

The control function of the first protocol can provide hybrid automatic repeat request (HARQ) functionalities. A higher level protocol mechanism may be used in some embodiments for retransmission of the data units instead of HARQ.

Information of the interruption may be provided by a media access control (MAC) protocol or radio resource control RRC protocol entity.

The update can comprise update of a maximum status transmit state variable to equal the highest received state variable or update of an unacknowledged mode receive state variable to equal an unacknowledged mode highest received state variable.

A status prohibit timer can be stopped and reset in response to consideration of the reordering timer as having expired.

Expiry of the reordering timer can be considered as having happened in response to the information of interruption even if the timer is not running.

It can be determined in response to information of the interruption that no further retransmissions of protocol data units transmitted so far in accordance with the first protocol can be expected. In response thereto a status protocol data unit in can be sent accordance with the second protocol and/or so far received service data units can be delivered to an upper protocol layer.

A communication device, for example a mobile station, can be configured to operate in accordance with the various embodiments.

A computer program comprising program code means adapted to perform the method may also be provided.

Embodiments will now be described in further detail, by way of example only, with reference to the following examples and accompanying drawings, in which.

In the following certain exemplifying embodiments are explained with reference to a wireless communication system serving devices adapted for wireless communication. Therefore, before explaining in detail the exemplifying embodiments, certain general principles of a wireless system, components thereof, and devices involved in wireless communication are briefly explained with reference to exemplifying system 10 of FIG. 1 device 20 of FIG. 2 and protocol stack of FIG. 3.

Figure 1:
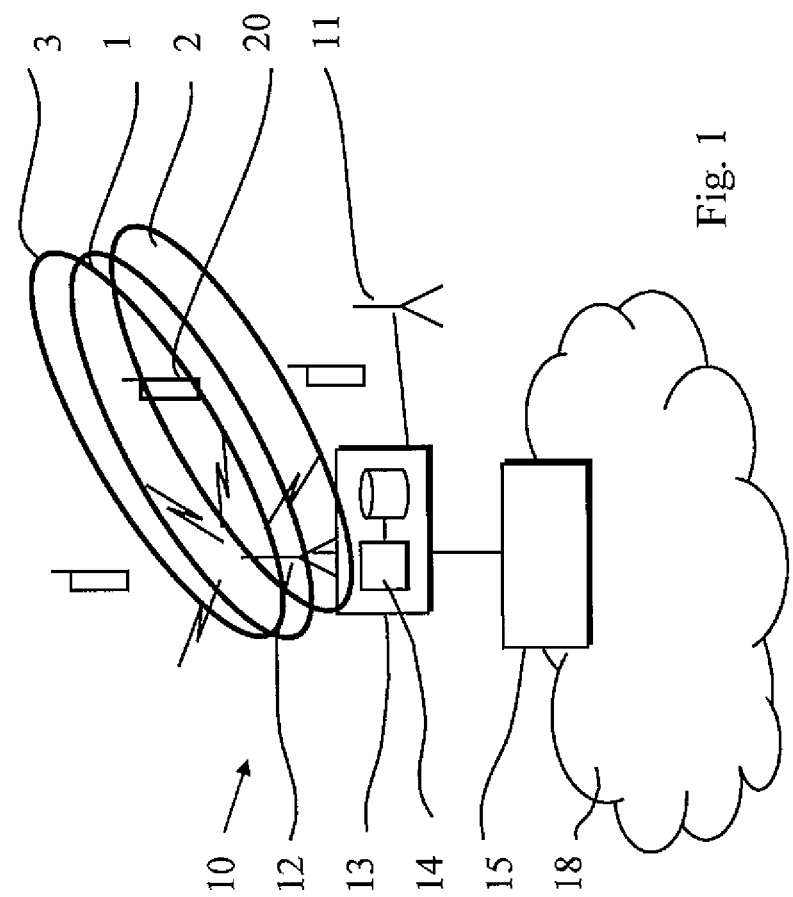
FIG. 1 shows an example of a system wherein below described embodiments may be implemented.

A communication device can be used for accessing various services and/or applications provided via a communication system. In wireless or mobile communication systems the access can be provided via a wireless access interface between mobile communication devices and an appropriate access system. For example, a communication device may access wirelessly a communication system via a base station. A base station site can provide one or more cells of a cellular system. A plurality of carriers can be provided by a cell or a base station. In the example of FIG. 1 a base station 12 is shown to provide three carriers 1, 2 and 3. Each communication device 20 and base station may have one or more radio channels open at the same time and may receive signals from more than one source. It should be appreciated that the number of carriers provided by a base station may vary over time.

It is noted that at least one of the carriers 1 to 3 may be provided by means of another station, for example by a remote radio head. Also, at least one of the carriers may be provided by a station that is not co-located at base station 12 but could only be controlled by the same control apparatus as the other cells. This possibility is denoted by station 11 in FIG. 1. For example, block 13 could be used to control at least one further station The controller of a cell has enough information for all of the aggregated carriers or cells.

A base station site is typically controlled by at least one appropriate controller so as to enable operation thereof and management of mobile communication devices in communication with the base station. For example, a control apparatus may be configured to provide control functions in association with generation, communication and interpretation of information regarding mobile access, error correction and retransmissions, handovers, carrier aggregation and/or other operations. The control apparatus may also provide various timers depending on the implementation of the system. The control entity can be interconnected with other control entities. The control entity may be part of the base station. In FIG. 1 the controller is shown to be provided by block 13. The controller apparatus may comprise data processing apparatus 14 comprising at least one memory, at least one data processing unit and an input/output interface. It shall be understood that the control functions may be distributed between a plurality of control units. The controller apparatus for a base station may be configured to execute an appropriate software code to provide the control functions as explained below in more detail.

In FIG. 1 the base station 12 is connected to a data network 18 via an appropriate gateway 15. A gateway function between the access system and another network such as a packet data network may be provided by means of any appropriate gateway node, for example a packet data gateway and/or an access gateway. A communication system may thus be provided by one or more interconnect networks and the elements thereof, and one or more gateway nodes may be provided for interconnecting various networks.

An example of a standardized architecture is known as the long-term evolution (LTE) of the Universal Mobile Telecommunications System (UMTS) radio-access technology. A non-limiting example of access network architectures where the herein described principles may be applied is known as the Evolved Universal Terrestrial Radio Access Network (E-UTRAN). The LTE and E-UTRAN are standardized by the 3rd Generation Partnership Project (3GPP). The various development stages of the 3GPP specifications are referred to as releases. A development of the LTE is often referred to as LTE-Advanced (LTEA). A non-limiting example of a base station of a cellular system is what is termed as a NodeB or evolved NodeB (eNB) in the vocabulary of the 3GPP specifications.

Figure 2:
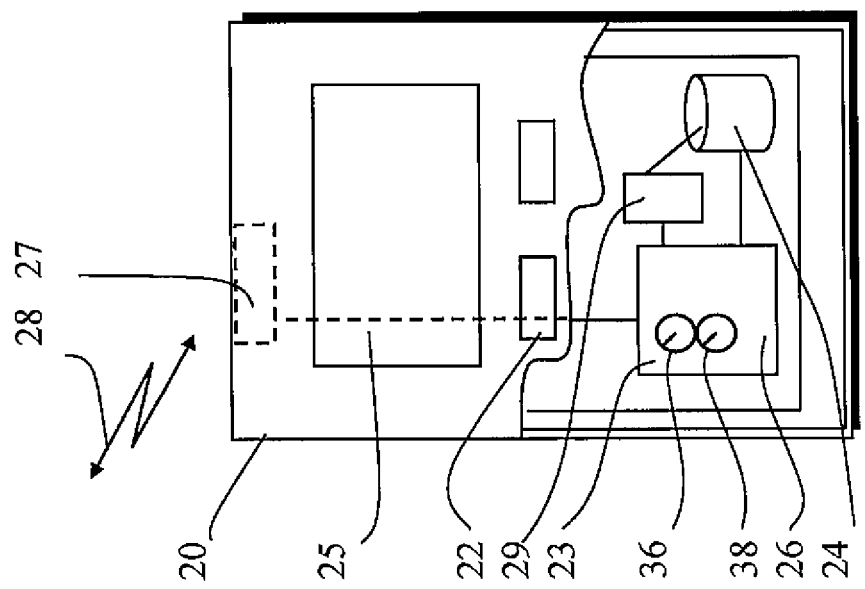
FIG. 2 shows an example of a communication device

FIG. 2 shows a schematic, partially sectioned view of a communication device 20 that a user can use for communications. Such a communication device is often referred to as user equipment (UE) or terminal. The device may be mobile or have a generally fixed location. An appropriate communication device may be provided by any device capable of sending and receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia, positioning data, other data, and so on. Users may thus be offered and provided numerous services via their communication devices. Non-limiting examples of these services include two-way or multi-way calls, data communication or multimedia services or simply an access to a data communications network system, such as the Internet.

A communication device is typically provided with at least one data processing entity 23, at least one memory 24 and other possible components 29 for use in software and hardware aided execution of tasks it is designed to perform, including control of access to and communications with base stations and other communication devices. The data processing, storage and other relevant control apparatus can be provided on an appropriate circuit board and/or in chipsets. This feature is denoted by reference 26. The control apparatus may provide various timers, such as a reordering timer 36 and prohibit timer 38. Operation thereof will be explained below in relevant contexts.

The user may control the operation of the communication device by means of a suitable user interface such as key pad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

The device 20 may receive and transmit signals 28 via appropriate apparatus for receiving and transmitting signals. In FIG. 2 transceiver apparatus is designated schematically by block 27. The transceiver apparatus is provided with radio capability. The transceiver may be provided for example by means of a radio part and associated antenna arrangement. The antenna arrangement may be arranged internally or externally to the mobile device.

Currently in systems such as those based on the LTE, intra-cell handover (HO) is usually performed for reconfigurations where synchronisation must be ensured between the eNB and the user equipment (UE) in order to avoid any ambiguity on whether the UE uses the old or the new configuration. For instance, because transmission time interval (TTI) bundling impacts HARQ (Hybrid Automatic-Repeat-Request) operation, the TTI bundling is usually enabled or disabled through an intra-cell handover. Similarly, if security keys need to be changed while staying in the same cell an intra-cell HO can be used. This may be the case for instance in order to avoid hyper frame number wrap-around (HFN). From the essential operational aspects intra-cell handovers do not differ from regular handover. A characteristic feature of intra-cell handover is though that signalling is with a target cell that is at the same time the source cell. In general it is noted that a "light handover" can be performed for any kind of intra-cell reconfiguration or intra-eNB serving cell change.

Figure 3:
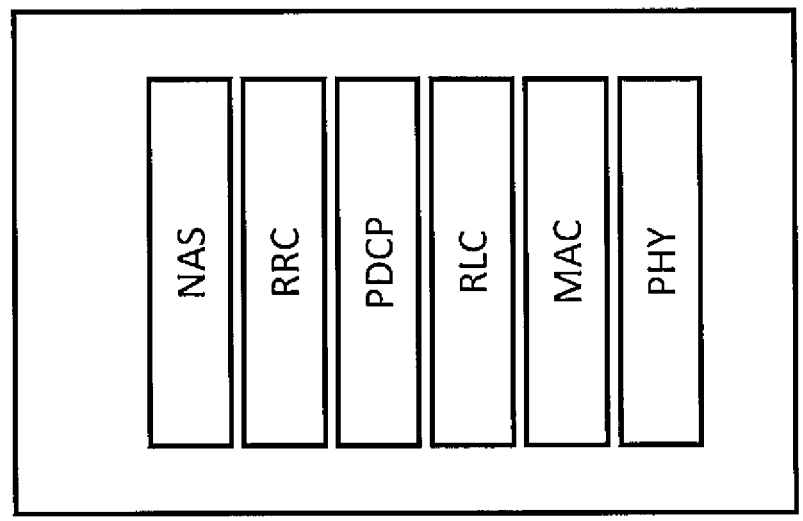
FIG. 3 shows an example of a layered protocol stack of a device.

In a handover such as the intra-cell handover media access control (MAC) protocol is reset and radio link control (RLC) and packet data convergence protocol (PDCP) are reestablished, security keys are updated and a random access procedure is performed in the target cell. FIG. 3 illustrates LTE protocol stack as provided for a device such as user equipment showing the hierarchical order of protocol layers for these protocols. Functionalities according to the protocols are provided by appropriate entities of the control apparatus in a user equipment. Of the above protocols media access control (MAC) refers to a data communication protocol sub-layer, also known as the medium access control. MAC is a sublayer of the data link layer specified in the seven-layer OSI model (layer 2), and in the four-layer Transport Control Protocol/Internet Protocol (TCP/IP) model (layer 1). A medium access controller can be provided for the control of the MAC sublayer operations. MAC provides addressing and channel access control mechanisms enabling several devices, e.g. user equipment or other terminals and/or network nodes to communicate within a multiple access network that incorporates a shared medium. MAC sub-layer can act as an interface between a Logical Link Control (LLC) sublayer and the network's physical layer. The MAC layer emulates a full-duplex logical communication channel in a multi-point network. Radio link control (RLC) in turn is a link-layer protocol that is responsible for error recovery and flow control. RLC protocol layer exists in user equipments and eNb and is a part of LTE air interface control and user planes. RLC sublayer provides functions such as transfer of upper layer protocol data units (PDUs), error correction through automatic repeat request (ARQ) for acknowledged mode (AM) data transfer, concatenation, segmentation and reassembly of RLC service data units (SDUs) for unacknowledged mode (UM) and AM data transfer, re-segmentation of RLC data PDUs for AM data transfer, in sequence delivery of upper layer PDUs for UM and AM data transfer, duplicate detection for UM and AM data transfer, protocol error detection and recovery, RLC SDU discard for UM and AM data transfer, and RLC re-establishment.

Figure 4:
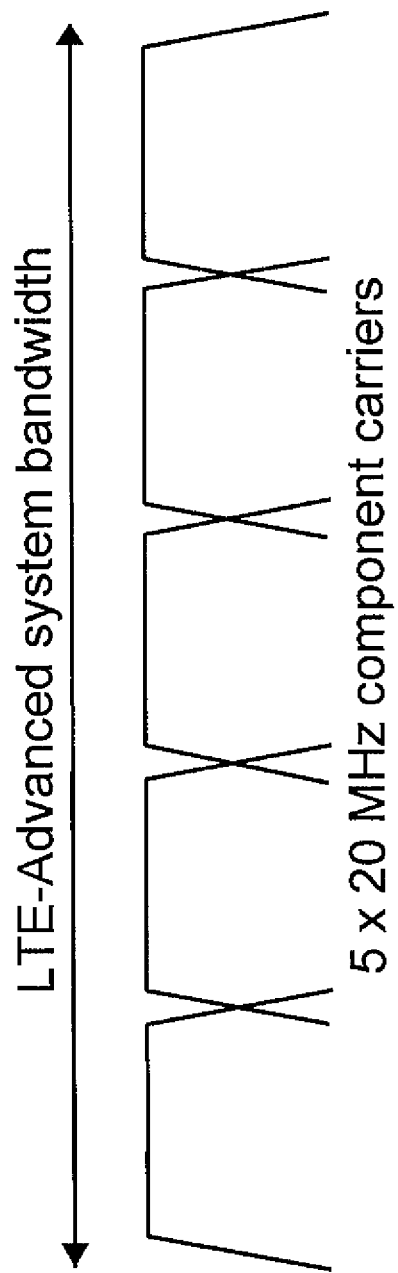
FIG. 4 shows an aggregated carrier.

A service data unit (SDU) refers typically to a unit of data that has been passed between protocol layers and that has not been encapsulated into a protocol data unit (PDU). A PDU can be understood as data unit that a protocol passes to/from a lower protocol layer. An SDU in turn can be understood as a data unit that is passed to/from a higher protocol layer. Hence, for example what is a PDU to RLC is an SDU to MAC. Carrier aggregation (CA) can be used to increase performance. In carrier aggregation a plurality of carriers are aggregated to increase bandwidth. Carrier aggregation comprises aggregating a plurality of component carriers into a carrier that is referred to in this specification as an aggregated carrier. For example, Release 10 (Rel-10) of the E-UTRA specifications introduces carrier aggregation (CA), where two or more component carriers (CCs) are aggregated in order to support wider transmission bandwidths. In CA it is possible to configure a communication device to aggregate a different number of CCs originating from the same eNodeB (eNB) and of possibly different bandwidths in the uplink (UL) and/or downlink (DL). In this regard a reference is made to FIG. 4 which shows five component carriers which have been aggregated. Each component carrier is 20 MHz in this example, giving an aggregated bandwidth of 100 MHz.

When CA is configured, the communication device, for example an user equipment (UE) only has one radio resource control (RRC) connection with the network. At radio resource control (RRC) connection establishment/re-establishment/handover, one serving cell provides the non access stratum (NAS) protocol mobility information (e.g. TAI; tracking area identity) and at RRC connection re-establishment/handover, one serving cell provides the security input. The security input may be one ECGI (E-UTRAN cell global identifier), one PCI (physical cell identifier and one ARFCN (absolute radio frequency channel number). This serving cell is referred to as the Primary Cell (PCell). In the downlink, the carrier corresponding to the PCell is the Downlink Primary Component Carrier (DL PCC) while in the uplink it is the Uplink Primary Component Carrier (UL PCC). Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore can consist of one PCell and one or more SCells. In is noted that 3GPP Release 8 terminals/user equipments are assumed to be served by one serving cell, while LTE-Advanced capable terminals/user equipments can receive or transmit simultaneously on multiple serving cells.

A handover procedure can be used despite the introduction of carrier aggregation. Regardless of whether the target cell belongs to the configured set of serving cells, a handover is used i.e. a procedure where MAC (media access control), RLC (radio link control) and PDCP (packet data convergence protocol) are reset, security keys are updated and a random access procedure is performed in the target cell. When MAC is reset HARQ transmission of MAC service data units (SDUs) received from radio link control (RLC) is interrupted. This occurs despite possible HARQ NACKs that have been received from the peer node i.e. the receiving MAC entity. Also, HARQ reception of MAC SDUs to be delivered to the RLC layer is interrupted. This occurs despite any possible HARQ NACKs that have been transmitted concerning failed reception of data units. When nothing is indicated to the RLC about the interruption and the RLC is not reset, a RLC-internal mechanism needs to detect the losses of such MAC SDUs, i.e. loss of the relevant RLC PDUs. An acknowledged mode (AM) RLC entity then needs to initiate sending NACKs and retransmission. In the case of unacknowledged mode (UM), an unacknowledged mode (UM) RLC entity needs to deliver received SDUs to upper layer despite the lost PDUs. These steps can cause unnecessary delay.

The current RLC-protocol specifications define that a receiving RLC entity shall use a reordering-timer (e.g. 36 in FIG. 2) to infer that a PDU that was not received amid other PDUs is no longer under HARQ processing at the MAC layer but has actually gone missing. When the reordering-timer expires, the value of a state variable is updated: for RLC-AM the maximum status transmit state variable VR(MS) keeps record of the lowest RLC-PDU sequence number for which neither a positive nor a negative acknowledgement (because of possible HARQ processing still underway) can yet be confidently sent. For RLC-UM, UM receive state variable VR(UR) holds the value of the sequence number (SN) of the earliest UMD PDU that is still considered for reordering.

The embodiments described below relate to optimisation of handling of interruptions within a device when one but not all protocol layers are interrupted, for example when RLC functions are maintained while MAC is reset. The embodiments can be applied to reception where determining is provided when non-received packets can be NACKed or overlooked at delivery of other packets to higher layer. An indication of the interruption of a first protocol can be given internally to a control function entity of a second protocol still running at the receiving node.

Figure 5:
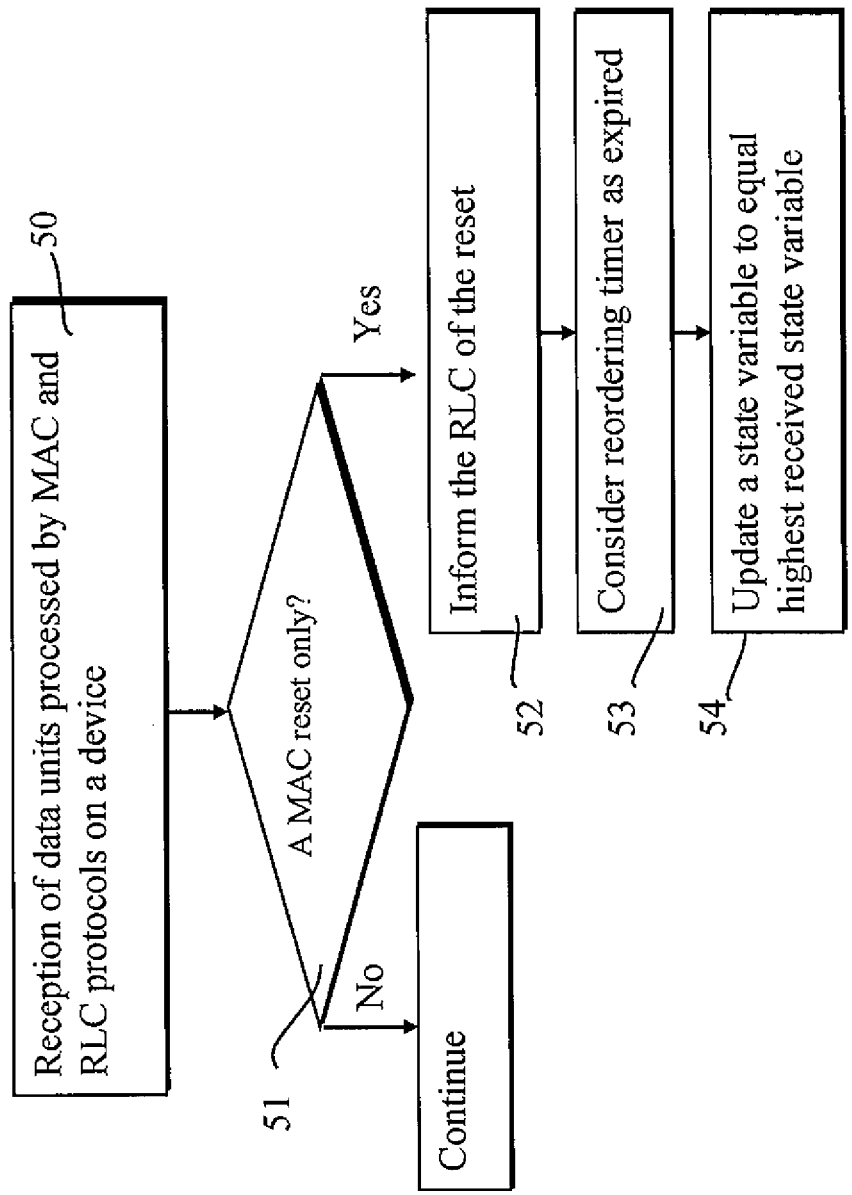
FIG. 5 shows a method of an embodiment.

In accordance with an embodiment illustrated by the flowchart of FIG. 5 reception of data units is handled at 50 based on a first protocol and a second protocol, and more particularly by means of MAC and RLC entities of a device. An interruption of a control function of the first protocol may be determined. For example, an RRC command by eNB can be received at 51 by a user equipment, the command indicating explicitly that only a MAC function of the user equipment shall be reset. Based on the RRC command the MAC is then reset and a RLC function residing at the user equipment is informed of the reset at 52. An indication of the MAC reset may be provided for each receiving RLC entity. At 53, subsequent of becoming aware of the MAC reset, the relevant RLC entity considers the reordering timer as having expired. Depending on the mode (UM or AM) an appropriate state variable is updated at 54 to equal with the highest received state variable.

It is noted that one or more of these steps may be performed under the control of one or more processors in association with one or more memories. The steps may be the result of one or more computer instructions being executed by one or more processors.

Certain more detailed examples are given below in relation to optimization of operation when MAC is reset while RLC is not reset. In accordance with an embodiment an improved status reporting mechanism for data transmissions between the peers (e.g. UE and eNB) in LTE networks is provided. A RLC entity of a node can decide immediately whether a RLC PDU needs to be retransmitted on higher layers (RLC ARQ). In evaluating the situation a decision algorithm can take into account the state of the MAC entity.

As mentioned above, an interruption can be caused by reset of a MAC entity. This may be triggered by a reset command, e.g. a lighter handover command from eNB, received on RRC layer of the UE. Only the MAC can be reset whereas higher layers like RLC and PDCP are not necessarily impacted by the reset command. The RRC layer can then instruct MAC to reset. If the MAC entity is reset based on reset command a decision algorithm can form a status report for the peer node immediately after the reset command is received by the MAC entity, and negative acknowledgement of RLC PDUs determined to be missing based on the latest status is sent. In RLC UM-mode, data packets which are correctly received are forwarded to the higher layers, whereas in RLC AM-mode data packets which have not been received correctly before the reset occurs are indicated for retransmission by RLC ARQ. The status report can be sent to the peer node after the MAC reset. By providing NACKs for RLC PDUs whose transmission has been interrupted rather than waiting for the reordering timer to expire it is possible to carry out more speedily RLC PDU retransmissions once the MAC has been reset.

In case of RLC-AM the operation can be such that if the reordering-timer is running, a relevant RLC entity can consider the timer to expire in response to the RRC entity of the UE informing the RLC layer about MAC reset. According to a possibility an indication of the reset is received from the MAC layer. The RLC entity can then update the maximum status transmit state variable VR(MS) to that of the present value of the highest received state variable VR(H). It is noted that if the reordering timer was not running, VR(MS) already equals VR(H).

The indication can also trigger status reporting. This reporting may be per the current specifications.

Triggering based on indication of reset rather than waiting for the expiry of the reordering timer can mean that an acknowledgement (positive or negative) can confidently be sent for all received PDUs up to and including the one with highest sequence number in the receiving window.

It is also possible, when the reordering timer is considered to expire as a result of determining a MAC reset, to stop and reset a status prohibit timer (e.g. timer 38 of FIG. 2) if such is running. This can be used to allow for immediate status reporting.

In accordance with an embodiment the reordering-timer is considered to expire even if it is not running. A consequence of this is that status reporting will become triggered in any case.

It is noted that in addition to retransmissions, similar principles can be applied to other actions as well, for example UM actions. In RLC-UM case, if the reordering timer is running, the RLC entity considers the timer to expire in response to an indication of MAC reset and thereafter updates the UM receive state variable VR(UR) to that of the present value of UM highest received state variable VR(UH). If the reordering timer was not running, VR(UR) would be VR(UH) already. This means that for all received PDUs up to and including the one with highest sequence number in the reordering window, the contained SDUs can be delivered to upper layer without violating in-order delivery.

Information of MAC reset can thus be used to provide a mechanism to indicate between protocol layers that no further MAC SDUs can be expected to finish ongoing HARQ retransmissions and then be delivered to the RLC entity. If a missing RLC PDU was being expected for reception, this will trigger sending an RLC status PDU to the peer RLC after the reset (RLC-AM) or delivering all SDUs received thus far to upper layer (RLC-UM), without unnecessary delay.

A more detailed example of RLC actions taken when reordering timer (t-Reordering in LIE) expires are presented in the following for UM and AM scenarios.

A receiving UM RLC entity shall, when an indication of reset of lower layer is received and if t-Reordering is running, determine t-Reordering to expire at this stage. When t-Reordering expires, the receiving UM RLC entity shall, if the expiry was due to an indication of reset of lower layer, set VR(UR) to VR(UH). If the expiry was not due to an reset indication, the receiving UM RLC shall update VR(UR) to the SN of the first UMD PDU with SN>=VR(UX) that has not been received. Other actions taken in response to the expiry can include reassembly of RLC SDUs from any UMD PDUs with SN<updated VR(UR), removal of RLC headers when doing so, and delivery of the reassembled RLC SDUs to an upper layer in ascending order of the RLC SN if not already delivered. Also, if VR(UH)>VR(UR) t-reordering can be started, and VR(UX) set to VR(UH).

In accordance with current RLC-AM, a Status-prohibit timer (e.g. timer 38 in FIG. 2) is used to prevent sending RLC Status PDUs (carrying the RLC ACK/NACKs) too frequently. This timer can be started every time a Status PDU is sent, and sending of another Status PDU is allowed only when this timer expires. In accordance with an embodiment a receiving AM RLC entity shall, when an indication of reset of a lower layer is received and if the re-ordering timer is running determine if t-StatusProhibit is also running, and if so, stop and reset t-StatusProhibit, and thereafter consider that the re-ordering timer has expired. When t-Reordering expires, the receiving side of an AM RLC pair shall, if the expiry was due to an indication of reset of lower layer, set VR(MS) to VR(H). Otherwise, the receiving AM RLC entity shall update VR(MS) to the SN of the first AMD PDU with SN>=VR(X) for which not all byte segments have been received. If VR(H)>VR(MS), t-Reordering shall be started and VR(X) set to VR(H). Reset indications to RLC entities may be given from MAC or RRC layer. The indication can be delivered only when MAC only is reset without a need to reset e.g. RLC. Thus, in accordance with some embodiments if MAC is reset at the same time as e.g. the RLC, then no indications are delivered, or such indications may be ignored.

When MAC is reset without an RLC reset, the RLC layer can take into account that HARQ protocol in MAC layer has been reset and that no more HARQ retransmissions are possible. This enables RLC to make faster decisions about retransmissions (e.g. faster re-transmission of RLC PDUs), polling and delivery to higher layers. By means of this, reduction in service disruption during handovers where the eNB architecture does not reset the RLC may be achieved.

The embodiments may allow for reduction of processing time of intra-cell handovers. For example, in LTE networks intra-cell handover has to be triggered whenever synchronous procedures have to be performed in eNB and user equipment (UE) to align to each other and when the UE does not change the serving cell. When MAC is reset but RLC is not, immediate confirmation that PDUs have gone missing may be given to RLC layer.

Intra-eNB handovers may become particularly important form of handovers in association with baseband pooling architectures. Scenarios where baseband pooling architectures such as for example liquid radio is deployed a handover is always used regardless of whether the target cell belongs to the same hardware pool as the source cell or not. Liquid radio is an example of technology that adapts the capacity and coverage of networks to match fluctuating user demand. The radio frequency elements and the antenna become active, sized and positioned according to need while baseband processing is pooled and sited remotely. Baseband pooling centralizes the digital signal processing typically done at base station sites and shares it with several sites to ensure that capacity is dynamically used where needed. This enables the network to match the actual capacity needs of end users as they change during the day or over longer periods.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

It is noted that whilst embodiments have been described in relation to LTE-Advanced, similar principles can be applied to any other communication system or indeed to further developments with LTE. Embodiments may be used where there is carrier aggregation in scenarios other than the LTE situations described above. Alternatively or additionally, embodiments may be used where a simplified handover procedure may be used. For example, the invention is applicable for carrier or cell aggregation even when coordinated multipoint (CoMP) is not supported, for example to multi-flow in standards such as High Speed Packet Access (HSPA). Also, instead of carriers provided by a base station a carrier may be provided by a communication device such as a mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein. It is also noted that the herein described embodiments may also be used for scenarios such as intra-frequency serving cell change.

The foregoing description has provided by way of non-limiting examples a full and informative description of certain embodiments of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
  receiving, by a control function of a second protocol of a receiving device, information from the receiving device about an interruption in a control function of a first protocol of the receiving device, said second protocol being a higher layer in a hierarchical order of protocol layers than said first protocol;
in response to receiving said information, stopping a reordering timer of the second protocol of the receiving device, when the reordering timer is running; and
in response to receiving said information, updating a state variable, other than a highest received state variable, of the second protocol of the receiving device to equal the highest received state variable of the second protocol of the receiving device,
wherein the second protocol is located above the MAC protocol in the layered protocol model, and wherein the second protocol is radio link control (RLC) protocol or packet data convergence protocol (PDCP).

2. The method as claimed in claim 1, wherein the interruption comprises a reset of the control function of the first protocol at a receiving node.

3. The method as claimed in claim 1, wherein the first protocol comprises media access control (MAC) protocol.

4. The method as claimed in claim 1, wherein the first protocol is medium access control (MAC) protocol and the control function thereof provides hybrid automatic repeat request (HARQ) functionalities.

5. The method as claimed in claim 1, further comprising:
using a higher level protocol mechanism for retransmission of the data units than MAC HARQ.

6. The method as claimed in claim 1, wherein said information of the interruption is received from a media access control (MAC) protocol or radio resource control RRC protocol entity.

7. The method as claimed in claim 1, wherein the update comprises update of a maximum status transmit state variable to equal the highest received state variable.

8. The method as claimed in claim 1, wherein the information triggers update of an unacknowledged mode received state variable to equal an unacknowledged mode highest received state variable.

9. The method as claimed in claim 1, further comprising:
stopping and resetting a status prohibit timer in response to stopping the reordering timer.

10. The method as claimed in claim 1, further comprising:
determining, in response to said information of the interruption, that no further retransmissions of protocol data units transmitted so far in accordance with the first protocol can be expected; and
in response thereto, sending a status protocol data unit in accordance with the second protocol and/or delivering so far received service data units to an upper protocol layer.

11. The method as claimed in claim 1, wherein the method is performed during intra-cell handover.

12. An apparatus comprising:
at least one processor; and
at least one memory including computer program code, wherein the at least one memory and the computer program code are configured, with the at least one processor, to cause the apparatus at least to:
receive, by a control function of a second protocol of the apparatus, information from the apparatus about an interruption in a control function of a first protocol of the apparatus, said second protocol being a higher layer in a hierarchical order of protocol layers than said first protocol;
in response to receiving said information, stop a reordering timer of the second protocol of the apparatus, when the reordering timer is running; and
in response to receiving said information, update a state variable, other than a highest received state variable, of the second protocol of the apparatus to equal the highest received state variable of the second protocol of the apparatus,
wherein the second protocol is located above the MAC protocol in the layered protocol model, and wherein the second protocol is radio link control (RLC) protocol or packet data convergence protocol (PDCP).

13. The apparatus as claimed in claim 12, wherein the interruption comprises a reset of the control function of the first protocol at a receiving node.

14. The apparatus as claimed in claim 12, wherein the first protocol comprises media access control (MAC) protocol.

15. The apparatus as claimed in claim 12, wherein the control function of the first protocol is adapted to provide hybrid automatic repeat request (HARQ) functionalities.

16. The apparatus as claimed in claim 12, wherein the at least one memory and the computer program code are further configured, with the at least one processor, to:
update a maximum status transmit state variable to equal the highest received state variable.

17. The apparatus as claimed in claim 12, wherein the at least one memory and the computer program code are further configured, with the at least one processor, to:
update an unacknowledged mode received state variable to equal an unacknowledged mode highest received state variable in response to the information.

18. The apparatus as claimed in claim 12, further comprising:
a status prohibit timer, wherein the apparatus is configured to stop and reset the status prohibit timer in response to stopping the reordering timer.

19. The apparatus as claimed in claim 12, wherein the at least one memory and the computer program code are further configured, with the at least one processor, to:
determine, in response to said indication, that no further retransmissions of protocol data units transmitted so far in accordance with the first protocol can be expected; and
in response thereto, cause sending of a status protocol data unit in accordance with the second protocol and/or delivery of so far received service data units to an upper protocol layer.

20. The apparatus as claimed in claim 12, wherein the apparatus is configured to handle reception of data units during intra-cell handover.

21. A communication device comprising the apparatus in accordance with claim 12.

22. A computer program product comprising a non-transitory computer readable storage medium bearing computer program code embodied therein for a computer, the computer program code comprising code for performing the following:
receiving, by a control function of a second protocol of the receiving device, information from the receiving device about an interruption in a control function of a first protocol of the receiving device, said second protocol being a higher layer in a hierarchical order of protocol layers than said first protocol;
in response to receiving said information, stopping a reordering timer of the second protocol of the receiving device, when the reordering timer is running; and
in response to receiving said information, updating a state variable, other than a highest received state variable, of the second protocol of the receiving device to equal the highest received state variable of the second protocol of the receiving device,
wherein the second protocol is located above the MAC protocol in the layered protocol model, and wherein the second protocol is radio link control (RLC) protocol or packet data convergence protocol (PDCP).

* * * * *